United States Patent [19]

Hauser

[11] Patent Number: 5,758,633
[45] Date of Patent: Jun. 2, 1998

[54] WIRE SAWING DEVICE

[76] Inventor: Charles Hauser, Chemin Nuyerattes, 1261 Genolier, Switzerland

[21] Appl. No.: 796,897

[22] Filed: Feb. 5, 1997

[30] Foreign Application Priority Data

Feb. 6, 1996 [CH] Switzerland .......................... 00302/96

[51] Int. Cl.$^6$ ...................................................... B28D 1/08
[52] U.S. Cl. ............................................ 125/16.02; 125/21
[58] Field of Search ........................ 83/651.1; 125/16.02, 125/21; 165/89, 90; 492/16, 46, 56

[56] References Cited

U.S. PATENT DOCUMENTS 4,134,384  1/1979  Schafft et al. .

FOREIGN PATENT DOCUMENTS

| 0 689 891 | 1/1996 | European Pat. Off. . |
| 55-090254 | 7/1980 | Japan . |
| 05 146968 | 6/1993 | Japan . |
| 05 220732 | 8/1993 | Japan . |
| 590 101 | 7/1977 | Switzerland . |

*Primary Examiner*—Timothy V. Eley
*Attorney, Agent, or Firm*—Young & Thompson

[57] ABSTRACT

The sawing device includes parallel wires (2) moving with alternating or continuous movement and supported by wire guide cylinders (4). The cylinders each include a rotatable sleeve (7) turning about a fixed shaft (5). There is thus obtained a better distribution of the loads applied to the rotating material, a decrease in heat sources, an improvement of the precision of sawing and a greater facility for disassembly and maintenance.

12 Claims, 4 Drawing Sheets

WIRE SAWING DEVICE

BACKGROUND OF THE INVENTION

This application corresponds to Swiss application 302/96 of Feb. 6, 1996, the disclosure of which is incorporated herein by reference.

The present invention relates to a wire sawing device comprising a frame, a layer of wires adapted to move with alternative or continuous movement while bearing against a piece to be sawed and supported by wire guiding cylinders.

There are known sawing devices comprising a layer of wires adapted to be displaced with a continuous or alternating movement whilst bearing against a piece to be sawed, thereby defining a sawing zone. The sawing zone is constituted by an assembly of cylinders disposed in parallel. These cylinders, called wire guides, are engraved with grooves defining the interval between the wires of the layer, thus the thickness of the slices sawed.

The wire guide cylinders are conventionally constituted by a hollow or filled monoblock portion clad with a synthetic element in which are engraved the grooves maintaining the spacement of the wires of the layer and secured at at least one of their ends by one or more bearings containing rollers. The wire guide cylinder is disassemblable to be able to be reconditioned after wear of its coating. Depending on the size of the wire guide cylinder, the latter can be mounted in cantilever fashion or held at its two ends. The forces induced by the tension of the layer of wires will be directly transmitted to the bearings, which gives rise to non-homogeneous and undesirable heating of the central portion because of the generation of heat from its ends. A system of temperature control is generally provided.

The end bearings must be perfectly aligned if it is desired to avoid important wear or untimely heating due to a hyperstatic instruction giving rise to uncontrolled resilient forces. However, because of the complexity and the size of the surrounding system, a strict control of the alignment of the bearings is difficult to carry out and their machining is delicate and costly.

Wire sawing devices provided with wire guide cylinders of the type mentioned are already known, especially in the industry of electric components, ferrites, quartz and silicas, to obtain a thin slice of material such as poly- or mono-crystalline silicon or new materials such as GAs, InP, GGG (gadolinium-gallium garnet) or again quartz, synthetic sapphire, namely ceramics. The high cost of these materials renders the sawing by wire more attractive compared to other techniques such as sawing by diamond disc.

The precision of the sawed pieces, which is very important for electronic applications, depends on the position of the wires in the course of sawing and on the support elements for the piece to be sawed, hence on the position of the wire guide cylinders relative to the piece to be sawed. This position will be a function of the temperature of the wire guide cylinders and hence of the load and of the precision of machining of the bearing supports of the blocks containing the roller bearings.

Electronic application requirements, for example connected to the increasing dimensions of ingots, render more and more difficult the mastery of the securement of the wire guide cylinders and their rapid demounting for reconditioning. Moreover, the frequency of reconditioning increases because of the precision required. The rollers supporting the guide wires comprise loads generating heat which is the greater if the position of alignment by bearings is bad by reason of the difficulty of machining the latter. This energy, additional to that produced in the course of sawing and diffused in the neighboring portions and particularly in the wire guide cylinder, contributes to the imprecision of cutting. This effect could be minimized, by using in production large elements of the wire guide cylinders, of a material of very low coefficient of thermal expansion. However, the drawbacks of the assembly remain, with the difficulties of machining.

SUMMARY OF THE INVENTION

The object of the invention consists in overcoming the mentioned drawbacks.

The sawing device achieves high precision and better distribution of the loads on the rollers, by using a central fixed portion forming a hub for the wire guide cylinder. The fixed central portion gives precision of alignment which is very great. This arrangement, with the fixed central portion and the rotatable sleeve, permits the use of wire guides of large diameter with smaller rollers than in the case of end bearings because of a better distribution of load, hence a decrease and better homogeneity of temperature.

According to a preferred embodiment, the fixed central portion is constituted by a central shaft passing through from one side to the other of the rotatable sleeve and maintained at its two ends rigidly to the frame.

These characteristics permit a further improved precision of alignment, because the fixed central portion is constituted by a monoblock piece and the ends are held in recesses which do not require particular precision. The construction is simplified. The mounting and the maintenance are facilitated and the precision of the sawed pieces is substantially improved.

The sleeve can be coated with a synthetic material, for example polyurethane, in which the grooves serving for guiding the wire are engraved. It can also be hollowed for lightening it, or to contain a cooling circuit.

Other advantages will become apparent from the characteristics expressed herein and of the description hereafter giving rise to them in greater detail with the help of the drawings which show schematically and by way of example an embodiment of the invention.

DESCRIPTION OF THE PREFERRED EMBODIMENTS

Figure 1:
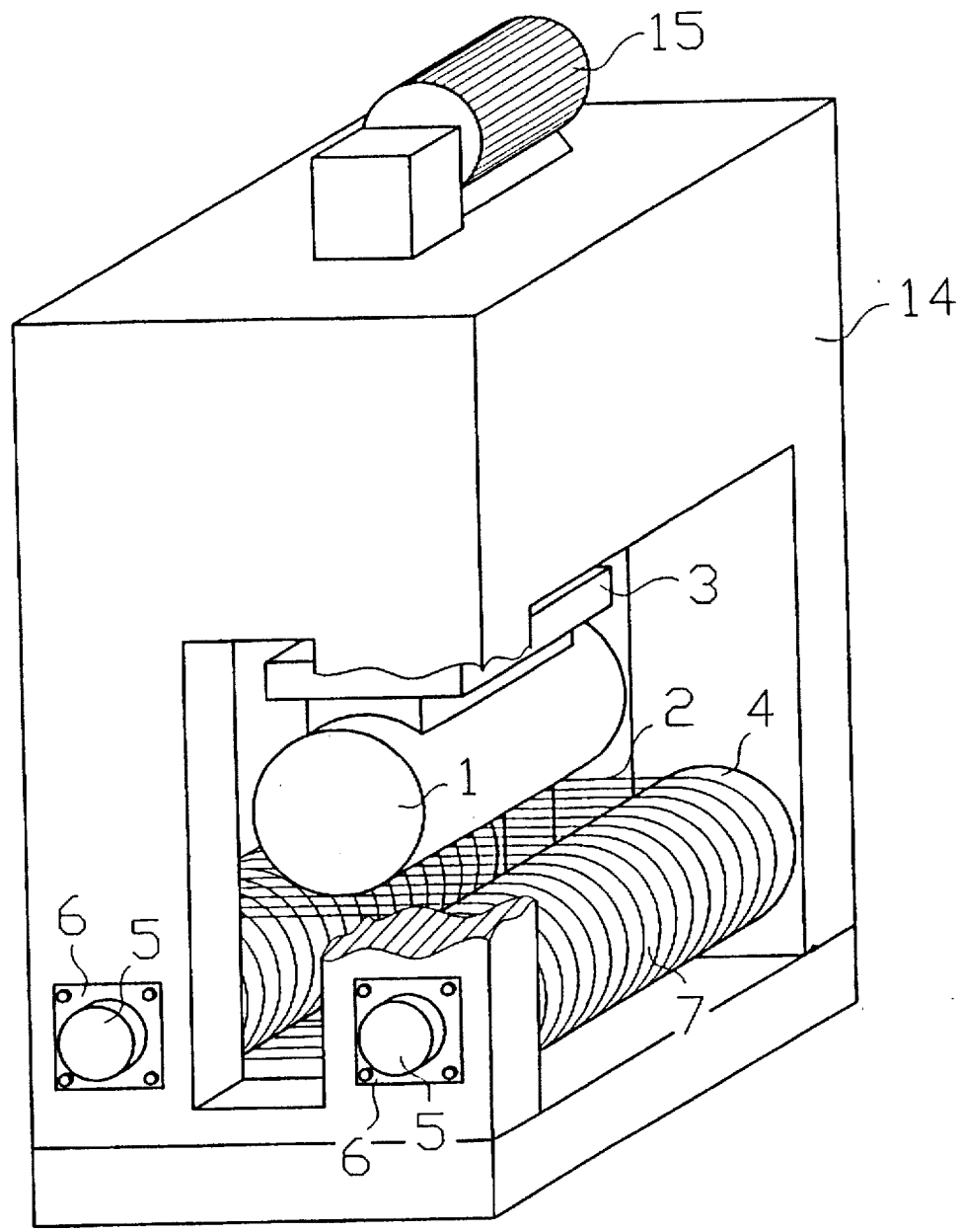
FIG. 1 is a perspective view of an embodiment of the wire sawing device.

The wire sawing device of FIG. 1 shows in perspective view the principle of the present invention. The piece 1 to be sawed is placed in bearing against the layer of wires 2 by the support table 3. The wire guide cylinders 4 are produced with a fixed axis 5 in a bearing 6 and a rotatable sleeve 7. The support table of the ingot is moved by an advance motor 15. The whole is integrated into a construction 14. The wires of the layer 2 are adapted to be driven by known means so as to be displaced with an alternating or continuous movement.

Figure 2:
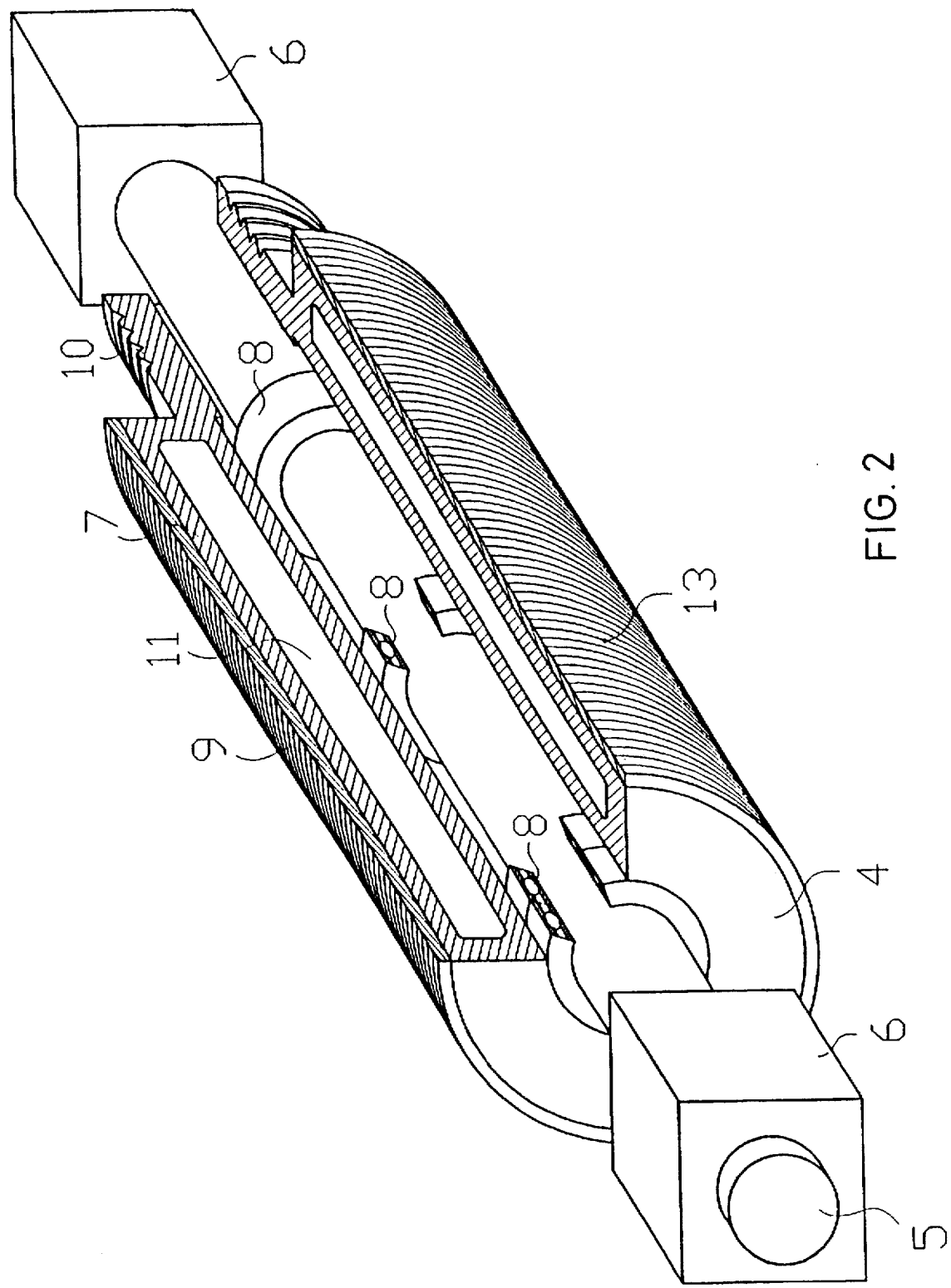
FIG. 2 is a perspective view partially cut away of a wire guide cylinder.

FIG. 2 shows in perspective a wire guide cylinder 4 having an axle or fixed shaft 5 held at each end by a fixed bearing 6 and passing through from one side to the other of the rotatable sleeve 7. This latter is mounted on rollers 8 and provided with a polyurethane protective coating 9. Its rotation is ensured by a drive pulley 10 located at one end and forming an integral part, in this example, of the rotatable sleeve 7. The rotatable sleeve 7 is provided with lightening chambers 11 permitting if desired a circulation of cooling fluid for the control of its temperature. The coating 9 is engraved with grooves 13. The rotatable sleeve 7 is preferably formed from a material with low coefficient of thermal expansion, for example an iron-nickel alloy.

Figure 3:
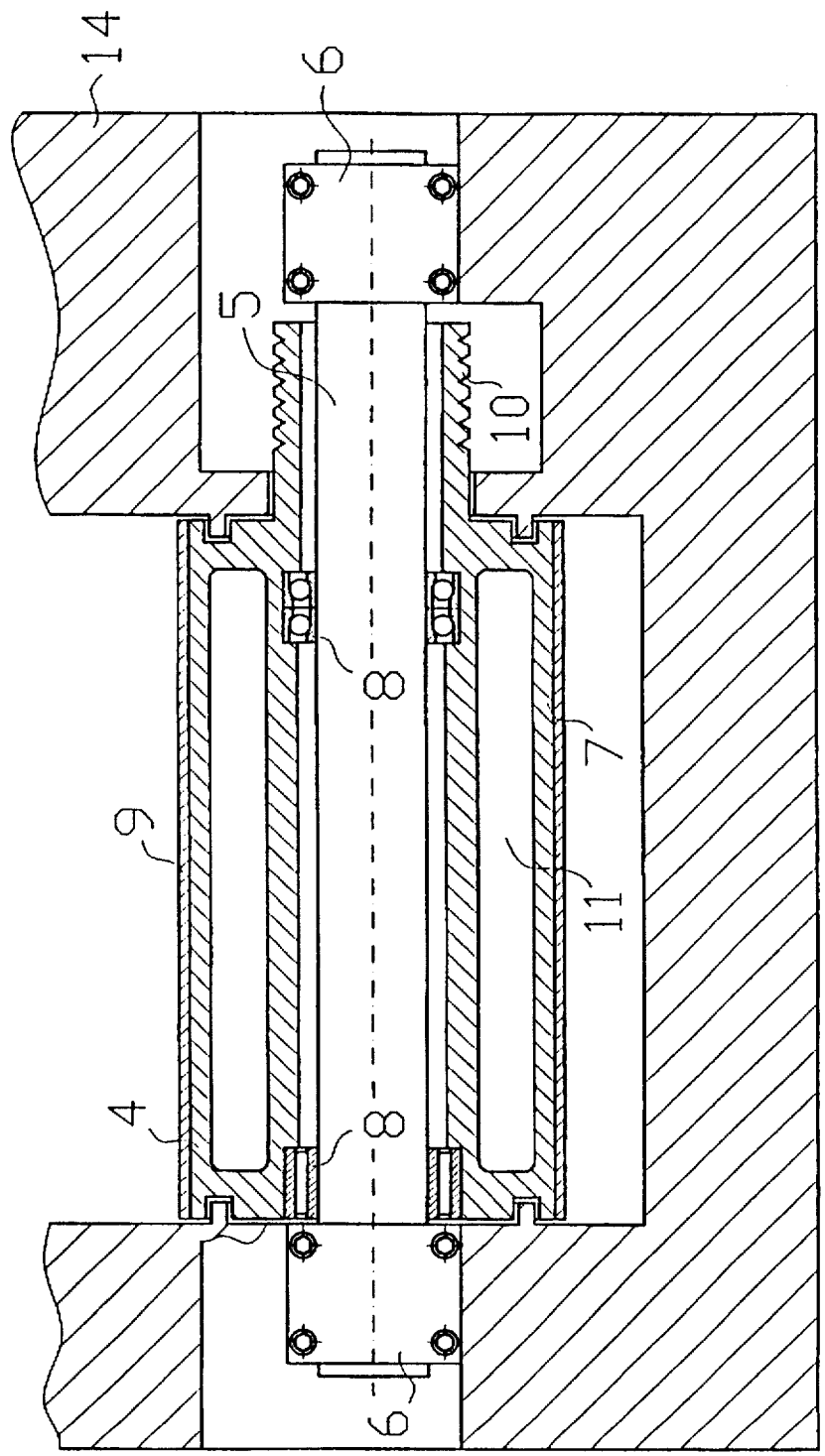
FIG. 3 is an axial cross-sectional view of this wire guide cylinder.

FIG. 3 shows a schematic cross-sectional view through the wire guide cylinder 4 having a fixed axle 5 maintained by two fixed bearings 6 against the frame 14 of the sawing device. The rotatable sleeve 7 provided with a lightening cavity 11 is clad with a layer of polyurethane 9. Driving the rotatable sleeve 7 is carried out by the pulley 10 located at one end of the rotatable sleeve 7. The rotatable sleeve 7 is supported by bearing members 8, which could be ball bearings, rollers, needle bearings, or bearings of any other nature.

Figure 4:
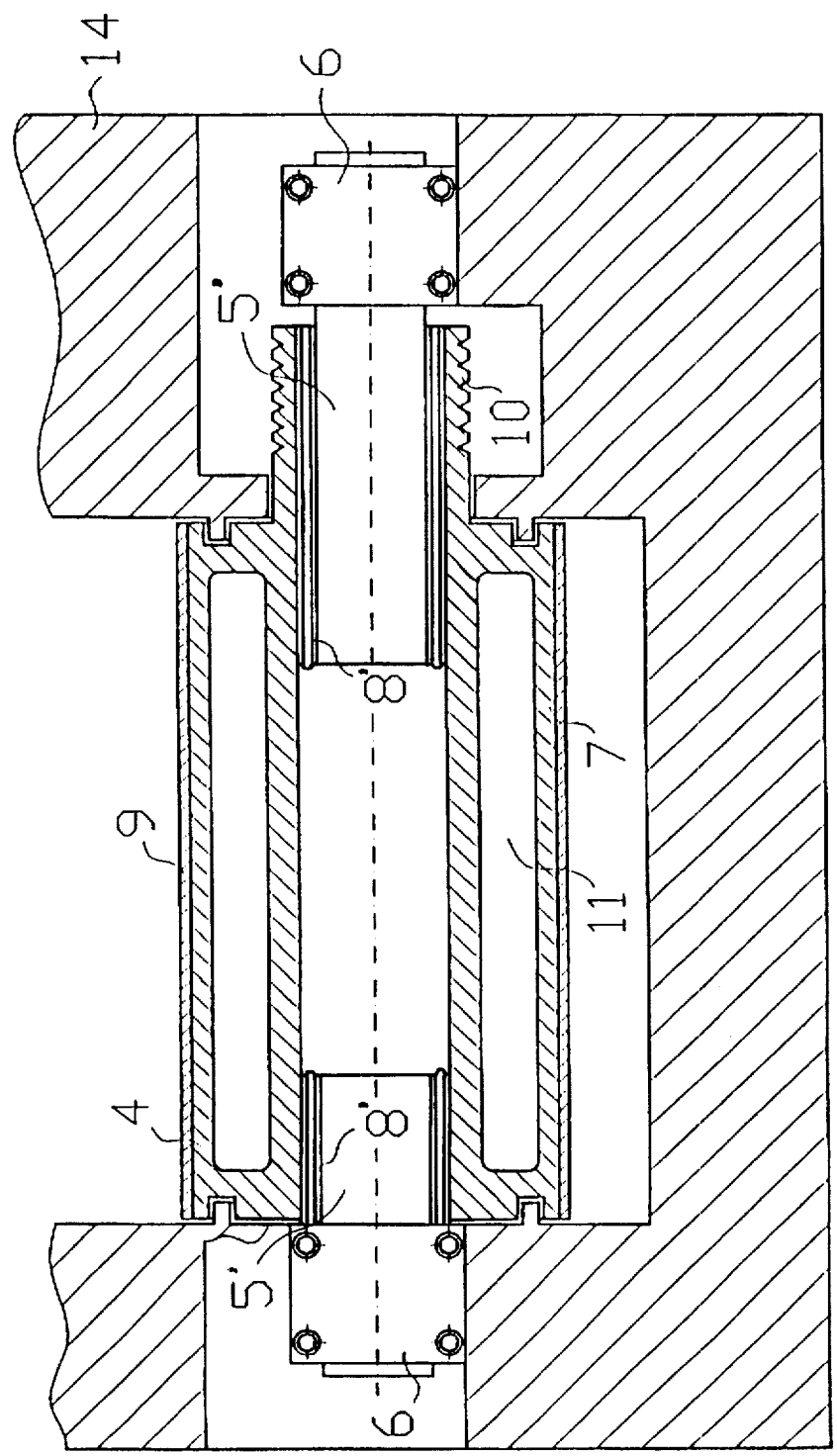
FIG. 4 is an axial cross-sectional view of a modified form of the wire guide cylinder.

The wire guide cylinder 4 shown in FIG. 4 is similar to that of FIG. 3, but the central through shaft has been replaced by two partial lateral shafts 5' fixed rigidly to the frame 14 and supporting the rotatable sleeve 7 on each side by means of bearing members which are here constituted by hydraulic or pneumatic film bearings.

Generally speaking, the wire saw forming the layer of wires 2 between the wire guide cylinders 4 is constituted of spring steel of a diameter comprised between 0.1 and 0.2 mm so as to saw the blocks of hard material or more particular compositions, such as silica, ceramics, compounds of elements of groups III-V, GGG (gadolinium-gallium garnet), sapphire, etc., with grooves of 0.1 to 5 mm thickness, generally speaking. The abrasive agent is a product of commerce and can be diamond, silicon carbide, alumina, etc., under a form fixed to the wire or in free form to be agitated by the wire.

The sawing device permits the use of wire guide cylinders 4 with a fixed axle 5 so as better to distribute the loads imposed on the rotatable sleeve 7, thereby to decrease the sources of heat and to simplify its construction, hence to improve the precision of the sawed members. Moreover, disassembly for maintenance is simplified.

Of course the embodiments described above are not in any way limiting and can receive any desirable modifications within the scope of the invention as defined by claim 1. Thus, other types of construction can be envisaged which by their nature preserve the central fixed portion 5 and the rotatable sleeve 7.

I claim:

1. A wire sawing device comprising:
    a frame;
    plural sawing wires; and
    plural wire guide cylinders for imparting movement to said wires while said wires bear against a piece to be sawn, each of said wire guide cylinders comprising,
    an immobile shaft with remote ends rigidly mounted on block bearings in said frame,
    a rotatable sleeve rotatably mounted on said shaft with bearing members between said block bearings, said sleeve being made of a material with a low coefficient of expansion and having a protective exterior coating with grooves in a first portion thereof for carrying said wires, and
    said sleeve further comprising a drive member at a second portion of said sleeve that is integral with said sleeve so as to be rotatable therewith, said drive member for receiving a force causing said sleeve to rotate, thereby imparting movement to said wires.

2. The device of claim 1, wherein said immobile shaft extends completely through said sleeve.

3. The device of claim 1, wherein said immobile shaft comprises two partial shafts with interior ends spaced from each other within said sleeve.

4. The device of claim 1, wherein said bearing member is selected from the group of bearings consisting of ball bearings, roller bearings, needle bearings, hydraulic film bearings and pneumatic film bearings.

5. The device of claim 1, wherein said sleeve comprises at least one interior space for a cooling fluid.

6. The device of claim 1, wherein said protective exterior coating comprises polyurethane.

7. The device of claim 1, wherein said drive member and said sleeve comprise one piece of said material with a low coefficient of expansion.

8. The device of claim 1, wherein said second portion is at an end of said sleeve and has a smaller exterior diameter than said first portion.

9. The device of claim 1, wherein said second portion comprises at least one groove for receiving a rotation-imparting belt.

10. A wire sawing device comprising:
    a frame;
    plural sawing wires; and
    plural wire guide cylinders for imparting movement to said wires while said wires bear against a piece to be sawn, each of said wire guide cylinders comprising,
    an immobile shaft with remote ends rigidly mounted on block bearings in said frame, and
    a sleeve rotatably mounted on said shaft, said sleeve comprising grooves in a central portion of said sleeve for carrying said wires and a drive member at an end portion of said sleeve with a diameter different than said central portion, said drive member having a groove therein for receiving a rotation-imparting belt that rotates said sleeve to impart movement to said wires, said central and end portions of said sleeve being a single piece of material.

11. The device of claim 10, wherein said immobile shaft extends completely through said sleeve.

12. The device of claim 10, wherein said immobile shaft comprises two partial shafts with interior ends spaced from each other within said sleeve.

* * * * *